United States Patent [19]

Roberts

[11] 4,122,475
[45] Oct. 24, 1978

[54] MICROFICHE DEVELOPER

[75] Inventor: William E. Roberts, Palos Verdes Penn., Calif.

[73] Assignee: Addressograph-Multigraph Corporation, Los Angeles, Calif.

[21] Appl. No.: 823,930

[22] Filed: Aug. 12, 1977

Related U.S. Application Data

[63] Continuation-in-part of Ser. No. 652,635, Jan. 26, 1976.

[51] Int. Cl.² .............................................. G03D 7/00
[52] U.S. Cl. .................................................. 354/300
[58] Field of Search .................... 355/27, 100, 99, 97, 355/79, 113, 122, 123, 91; 354/297, 300

[56] References Cited

U.S. PATENT DOCUMENTS

| | | | |
|---|---|---|---|
| 2,000,390 | 5/1935 | Huebner | 355/91 |
| 3,323,436 | 6/1967 | Hafer et al. | 354/300 |
| 3,364,833 | 1/1968 | Mulvany | 354/300 |
| 3,528,355 | 9/1970 | Blackert | 355/27 X |
| 3,705,769 | 12/1972 | Johannsmeier | 355/78 X |

Primary Examiner—Donald A. Griffin
Attorney, Agent, or Firm—Michael A. Kondzella

[57] ABSTRACT

A microfiche developer of a type which includes upper and lower walls that are slightly spaced to receive a microfiche, and which also includes a seal extending around a region between the plates where the microfiche lies, to seal this region when pressured ammonia or other developer is introduced through a conduit in the lower wall into this region to develop a microfiche therein. Passages are formed in the upper wall to receive air during the period when ammonia is pumped into the sealed region, to draw the microfiche up against the upper wall so that all of the lower face of the microfiche which carries the emulsion, is exposed to the developer. The seal is an elastomeric ring with radially inner and outer flanges that are held down and sealed to the lower wall, a middle portion which can be deflected up against the upper wall, and intermediate portions which lay up against the supporting wall portions when the middle portion is deflected up.

3 Claims, 6 Drawing Figures

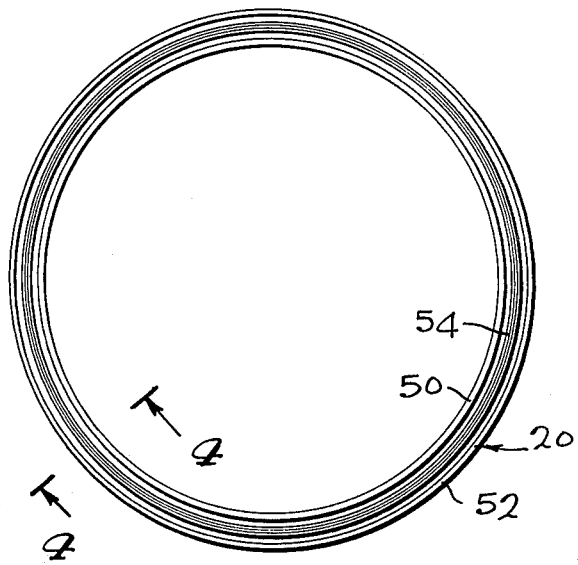
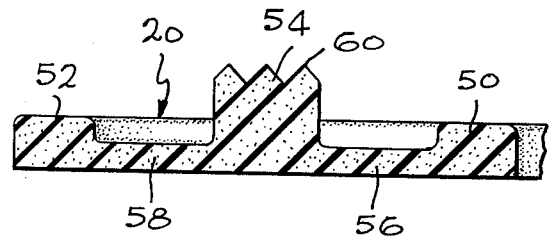
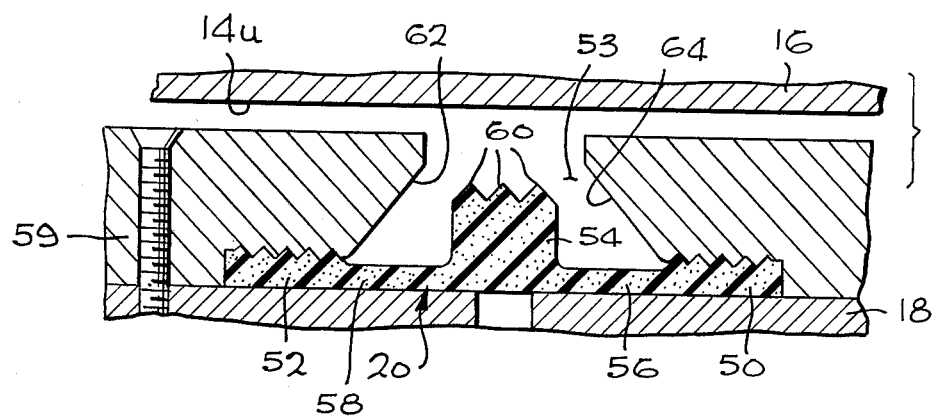
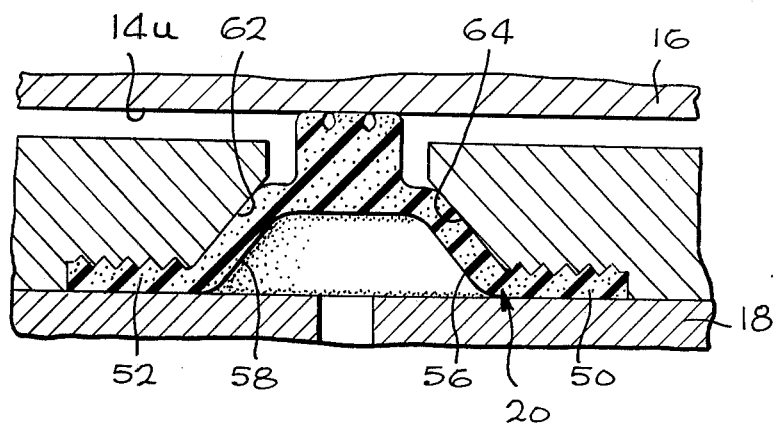

MICROFICHE DEVELOPER

CROSS REFERENCE TO RELATED APPLICATIONS

This is a continuation-in-part of U.S. patent application Ser. No. 652,635 filed Jan. 26, 1976.

BACKGROUND OF THE INVENTION

An exposed microfiche can be developed by inserting it between two closely spaced walls and then raising a seal to seal a region between the walls in which the microfiche lies. Then a pressured developing fluid, such as anhydrous ammonia at a pressure of approximately 25 psi, is applied through a passage formed in one of the walls, such as the lower wall of the chamber.

One problem often encountered with the above developing arrangement is the occurrence of an uneven flow of developing fluid to the microfiche surface which is to be developed. A microfiche often assumes a bowed-up configuration, so that its opposite end portions lie almost flat against the lower walls of the chamber, and the developing fluid cannot reach these end portions to fully develop them. Another problem which can be encountered is that the seal which must seal the region around the microfiche, can repeatedly rub against a side supporting wall and wear out.

SUMMARY OF THE INVENTION

In accordance with one embodiment of the present invention, a microfiche developer is provided which assures the application of developing fluid to all regions of the emulsion of a microfiche, and which assures reliable sealing of the developing chamber. One wall of the developing chamber which faces the non-emulsion side of the microfiche, has outlets therein which allow the escape of air or the like which lies in the developing chamber when developing fluid such as ammonia is pumped into the chamber under pressure. The fact that the outlets are under lower pressure than the pumped in developing fluid, results in the non-emulsion side of the microfiche being pressed against the wall which has the outlet, so that the emulsion side of the microfiche is well exposed to the developing fluid.

The ring-shaped seal which seals a region between the plates, has inner and outer flanges sealed to one of the walls, a middle portion which can move against the opposite walls to seal thereagainst, and intermediate portions which connect the middle seal portion to the flanges. Air under pressure is utilized to deflect the middle sealed portion. The apparatus is constructed with walls which support the intermediate seal portions when the middle of the seal is deflected, to minimize stresses and wear on the seal.

The novel features of the invention are set forth with particularity in the appended claims. The invention will be best understood from the following description when read in conjunction with the accompanying drawings.

BRIEF DESCRIPTION OF THE DRAWINGS

FIG. 3 is a plan view of the seal of FIG. 1;

FIG. 4 is an enlarged view of the region 4—4 of FIG. 3;

FIG. 5 is an enlarged view of a region of FIG. 3, shown with the seal deflected into a nonsealing configuration; and FIG. 6 is a view similar to FIG. 5, but with the seal in a sealing configuration.

DESCRIPTION OF THE PREFERRED EMBODIMENTS

Figure 1:
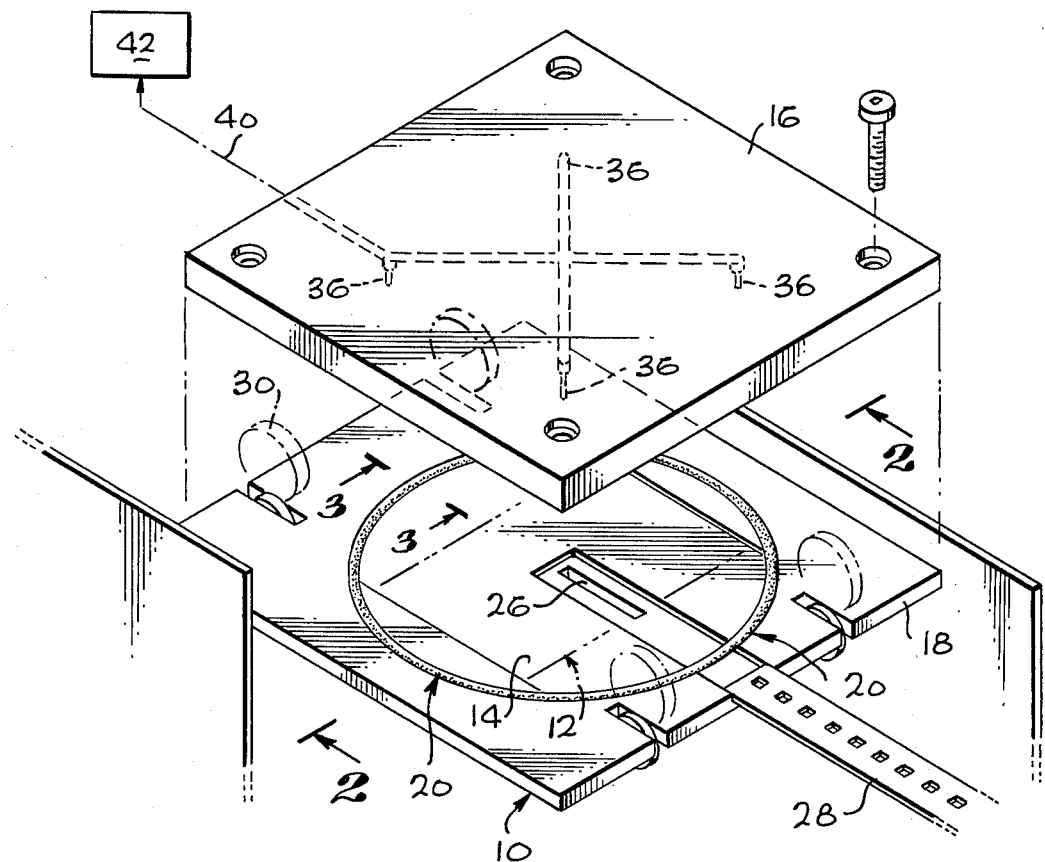
FIG. 1 is a partially exploded perspective view of a microfiche developer constructed in accordance with one embodiment of the invention.
Figure 2:
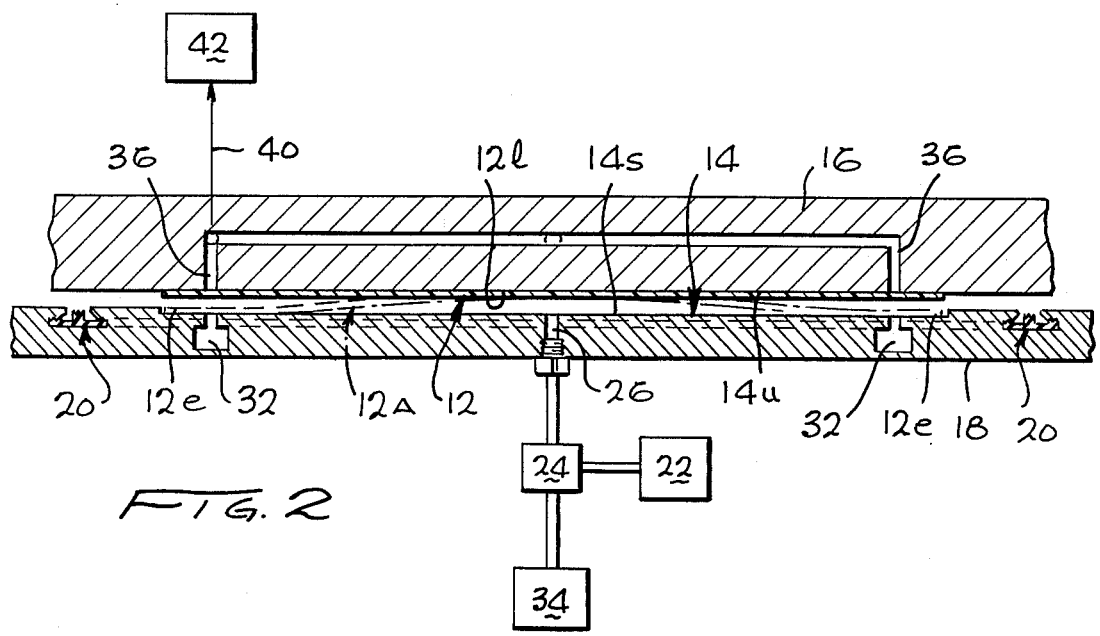
FIG. 2 is a view taken on the line 2—2 of FIG. 1.

FIGS. 1 and 2 illustrate a developing station 10 for an exposed microfiche 12 which is to be developed by immersing it in pressured anhydrous ammonia. The developer includes a chamber 14 formed by a pair of plates 16, 18 which are spaced a small distance apart, and by a seal 20 which can seal the region between the plates to complete the chamber. Pressured anhydrous ammonia can pass from a source 22 through a valve 24, and through an inlet 26 to enter the chamber 14, to develope the microfiche 12 lying therein. Development of the microfiche is accomplished by first moving a push bar 28 (FIG. 1) forward to push the microfiche 12 to the position shown in FIG. 1, the push bar then retracting to the illustrated position. The seal 20 is then deployed to a sealing position and ammonia is introduced into the chamber. The ammonia is then evacuated, the seal 20 is retracted, and the pusher bar 28 is advanced further to push the microfiche 12 partially out of the chamber so it can be engaged by a pair of rollers 30 which continue the movement of the microfiche.

FIG. 2 illustrates the microfiche at 12A, in a bowed configuration wherein opposite ends 12e of the microfiche tend to lie flat against the lower surface 14s of the chamber. This can arise because of the microfiche being cut from a roll which tends to provide curvature, and because moisture is often present so that the ends of the microfiche can be held by surface tension to the chamber wall. In addition, air plenums 32 are provided in the lower wall, which receive pressured air when anhydrous ammonia under pressure, such as 25 psi, is admitted through the inlet 26. The pressured air in the plenums is useful during evacuation of the chamber after the developing of the microfiche. By supplying pressured air which helps sweep out ammonia in the chamber later, evacuation can be accomplished through the inlet 26 and through the valve 24 into an ammonia absorber 34 which may comprise a bath of water and citric acid which absorbs the anhydrous ammonia. However, the air entering the plenums initially presses the opposite ends of the microfiche sheet against the lower chamber surface 14s.

In accordance with the invention, the upper plate 16 is provided with a series of outlets 36 which are coupled, through an ammonia absorber or dump 42 to the atmosphere. When the pressured developing fluid is pumped into the chamber through the inlet 26, air and vapors in the chamber 14 tend to escape through the outlets 36. This upwardly rushing air tends to pull up the end portions 12e of the microfiche, so that the microfiche moves from the position 12A up to the position 12 shown in FIG. 2, wherein the microfiche seals the outlets 36 and is held against the outlets 36 by the lower pressure therein than in the chamber. As a result, the entire lower side 12l of the microfiche, which is the side containing the emulsion, is fully exposed to the developing fluid in the chamber, to assure even development of the microfiche. The outlets 36 are connected together and to a tube 40 that leads to a dump 42 such as a water bath, to adsorb any ammonia vapors that flow through the tube.

The seal 20 which extends in a ring about the developing chamber, is designed to enable low cost manufacture while providing good sealing and a long lifetime of use. The seal by itself is not inflatable, but is instead formed with radially inner and outer flanges 50, 52 that are held to the lower surface of a groove 53 in the plate 18, so that pressured air introduced under the seal can force up a middle seal portion 54 against the upper wall or surface 14u of the chamber. The middle seal portion 54 which seals against the upper wall, is connected by flexible intermediate portions 56, 58 to the mounted flanges 50, 52.

In order to provide reliable sealing of the middle seal portion to the upper chamber surface or wall, the middle portion is provided with three separate ridges 60 which each can bear against the upper wall 14u. The ridges reduce the area of contact with the upper wall so that larger contact pressures are obtained, than if just a flat upper seal portion were utilized. In addition, the three separate sealing rings provided by the three ridges, assure reliable sealing since even one of them can seal in the ammonia gas even if the others are damaged.

The reliability of the seal ring 20 could be limited primarily by the intermediate seal portions 56, 58 which are relatively thin, if these intermediate portions were either left unsupported when the seal was deflected upwardly, or if these intermediate portions rubbed on any support lying above them. The lower wall 18 and a member 59 which holds down flange 52 form a pair of inclined support surfaces 62, 64 which abut the intermediate portions when the seal is upwardly deflected as shown in FIG. 6, with minimal rubbing on the intermediate portions since the intermediate portions tend to lay progressively onto these inclined surfaces as the seal is deflected upwardly.

Thus, the invention provides a developer which assures uniform application of developing fluid to a microfiche, and which assures reliable sealing of the developing chamber. Uniform developing, especially at the opposite sides of a microfiche, is achieved by utilizing outlets in a wall facing the non-emulsion side of the microfiche, so than when pressured developing fluid is pumped into the chamber the microfiche is drawn against the outlets to expose all of the emulsion to the developing fluid. The seal for sealing the periphery of the chamber is formed by a deflectable ring seal with radially inner and outer flanges held to the lower wall and a middle portion which can be deflected against the upper wall. The lower wall is provided with support surfaces against which the intermediate seal portions deflect without rubbing, when the middle seal portion is upwardly deflected.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A microfiche developer comprising:
a developing chamber having first and second closely spaced walls for receiving a microfiche between them at a predetermined microfiche position therein;
means for coupling a source of pressured developing fluid to said chamber;
developer absorber means; and
at least two air outlets formed in said first wall at positions near opposite sides of said predetermined microfiche position; said outlets being connected together and coupled through said developer absorber means to the atmosphere, whereby to draw the microfiche against said first wall.

2. A microfiche developer comprising:
first and second closely spaced walls;
a ring-shaped elastic non-inflatable elastic seal surrounding a portion of said first wall, said seal having radially inner and outer flange portions, a middle seal portion, and a pair of intermediate seal portions, each connecting said middle seal portion to a different one of said flanges;
means for sealing said inner and outer flanges to said first wall; and
means activatable to deflect the middle portion of said seal across the space between said walls and against said second wall and simultaneously to deflect said pair of intermediate seal portions against said means for sealing said inner and outer flanges to said first wall, whereby to form a fluid seal thereagainst.

3. A microfiche developer comprising:
first and second closely spaced walls;
a ring-shaped elastic seal surrounding a portion of said first wall, said seal having radially inner and outer flange portions, a middle seal portion, and a pair of intermediate seal portions, each connecting said middle seal portion to a different one of said flanges;
means for sealing said inner and outer flanges to said first wall; and
means activatable to deflect the middle portion of said seal across the space between said walls and against said second wall;
said means for sealing said flanges and said first wall forming a part of inclined walls angled toward one another to lie progressively closer at positions progressively further from the level of the seal flanges and positioned to receive and support said intermediate seal portions as said middle seal portion advances toward said second wall.

* * * * *